United States Patent [19]

Franks et al.

[11] 4,196,282

[45] * Apr. 1, 1980

[54] PROCESS FOR MAKING A SHAPEABLE CELLULOSE AND SHAPED CELLULOSE PRODUCTS

[75] Inventors: Neal E. Franks, Suffern, N.Y.; Julianna K. Varga, Asheville, N.C.

[73] Assignee: Akzona Incorporated, Asheville, N.C.

[*] Notice: The portion of the term of this patent subsequent to Mar. 20, 1996, has been disclaimed.

[21] Appl. No.: 938,907

[22] Filed: Sep. 1, 1978

Related U.S. Application Data

[63] Continuation-in-part of Ser. No. 854,957, Nov. 25, 1977, Pat. No. 4,145,532.

[51] Int. Cl.² ............................................. C08B 16/00
[52] U.S. Cl. ..................................... 536/56; 106/168; 106/176; 536/57
[58] Field of Search ................... 536/56, 57; 106/168, 106/176

[56] References Cited

U.S. PATENT DOCUMENTS

| | | | |
|---|---|---|---|
| 2,179,181 | 11/1939 | Granacher et al. | 106/163 R |
| 2,744,292 | 5/1956 | Schlosser et al. | 106/168 |
| 3,447,939 | 6/1969 | Johnson | 536/43 |
| 3,508,941 | 4/1970 | Johnson | 106/162 |
| 3,758,457 | 9/1973 | Broeck et al. | 536/57 |

*Primary Examiner*—Ronald W. Griffin
*Attorney, Agent, or Firm*—Francis W. Young; Jack H. Hall

[57] ABSTRACT

An improved process is provided for making a precipitated cellulose product wherein cellulose is dissolved in a solvent containing both a tertiary amine N-oxide solvent and water and precipitated therefrom with water or other non-solvent for cellulose. The water content of the solution may be adjusted to any level of up to about 29% by weight with the amount of water decreasing substantially linearly as the cellulose is increased. A solution substantially free from undissolved cellulose and solid tertiary amine N-oxide which is adapted to be spun, extruded or molded at a temperature below the melting point of the tertiary amine N-oxide can be prepared with a solvent which contains water within a specified critical range mixed with the tertiary amine N-oxide. Preferably, N,N,N-triethylamine N-oxide or a tertiary amine N-oxide having a cyclic or pseudo-cyclic molecular structure is mixed with water to form the solvent.

22 Claims, 5 Drawing Figures

N,N-DIMETHYLCYCLOHEXYLAMINE N-OXIDE AND WATER

N,N-DIMETHYLETHANOLAMINE N-OXIDE AND WATER

N-METHYLMORPHOLINE N-OXIDE AND WATER

PROCESS FOR MAKING A SHAPEABLE CELLULOSE AND SHAPED CELLULOSE PRODUCTS

This invention relates generally to a shapeable solution containing cellulose and, more particularly, to an improved process for preparing solutions of cellulose in a tertiary amine N-oxide and for making shaped cellulosic articles such as fibers and filaments therefrom. This application is a continuation-in-part of our copending application Ser. No. 854,957 filed on Nov. 25, 1977, now U.S. Pat. No. 4,145,532, issued Mar. 20, 1979, the disclosure of which is incorporated to a large extent herein and additionally by reference thereto.

A process for dissolving cellulose in a tertiary amine N-oxide is disclosed by Graenacher et al in U.S. Pat. No. 2,179,181. In accordance with the disclosure, N-oxides of trimethylamine, triethylamine, tripropylamine, monomethyldiethylamine, dimethylmonoethylamine, monomethyldipropylamine, N,N-dimethyl-, N,N-diethyl- or N,N-dipropylcyclohexylamine, N,N,-dimethylmethylcyclohexylamine and pyridine may be used. The solutions disclosed by Graenacher have a relatively low solids content of from 7% to 10% by weight of cellulose dissolved in 93% to 90% by weight of the tertiary amine N-oxide. Such solutions are not entirely satisfactory for extruding, spinning or other shaping process because the cellulose in the shaped solution must be precipitated by direct wet spinning and a large amount of solvent must be removed from the shaped product. Insofar as the disclosure is concerned, the Graenacher concept uses an anhydrous solution.

Another process for dissolving cellulose or other compounds having strong intermolecular hydrogen bonding in a tertiary amine N-oxide is disclosed by Johnson in U.S. Pat. No. 3,447,939. A cyclic mono-(N-methylamine N-oxide) compound such as N-methylmorpholine N-oxide is used as the solvent. The solution can be used in chemical reactions involving the dissolved compound or to precipitate the cellulose to form a film or filament. In accordance with the process, the solution is maintained as a liquid until it is used. It appears from the examples in the patent that the disclosed solutions have much the same disadvantages of those prepared by the process disclosed in U.S. Pat. No. 2,179,181, because they are also of low solids content.

In accordance with the process disclosed by Johnson in U.S. Pat. No. 3,508,941, two or more different polymers are dissolved in a cyclic mono-(N-methylamine N-oxide) compound and are precipitated together to produce a bicomponent polymer mixture. A non-solvent for cellulose such as dimethyl sulfoxide, N-methylpyrrolidone or sulfolane may be added to the solution as a diluent to reduce its viscosity. The disclosed solutions have the same disadvantages as those of U.S. Pat. Nos. 2,179,181 and 3,447,939.

It is a general object of this invention to provide an improved process for making a shaped cellulose product. Another object of this invention is to provide a solution of cellulose in tertiary amine N-oxide of relatively high solids content which is adapted for shaping into a cellulosic article such as by extrusion or spinning. A further object of the invention is to provide an improved process for making a shapeable solution of cellulose in a tertiary amine N-oxide having a higher concentration of cellulose in a tertiary amine N-oxide solvent for cellulose than those solutions which have been available heretofore. Still another object of the invention is to provide a solution of cellulose in a solvent containing a tertiary amine N-oxide which is substantially free from undissolved cellulose and solid tertiary amine N-oxide, has a higher solids content than the tertiary amine N-oxide solutions of the above-discussed prior art and has a viscosity which adapts it for shaping such as by extrusion or spinning at a temperature below the melting point of the tertiary amine N-oxide. A still further object of the invention is to provide a tertiary amine N-oxide solvent for cellulose which will dissolve cellulose at temperatures below the melting point of tertiary amine N-oxides which are solids at ambient temperatures to form shapeable solutions of high solids content.

Other objects will become apparent from the following description with reference to the drawing wherein.

As set forth in our earlier application, the foregoing objects and others are accomplished in accordance with this invention, generally speaking, by providing a process wherein cellulose is mixed with a tertiary amine N-oxide solvent therefor which contains an amount of water which does not precipitate the cellulose and which facilitates the dissolution of cellulose in the solvent to provide a solution having a cellulose solids content and viscosity which adapt the solution for extrusion, spinning or similar shaping and subsequent precipitation with a non-solvent such as water for cellulose to form films, filaments and molded articles of cellulose. Stated in another way, the invention provides a method for dissolving cellulose in a solvent containing a tertiary amine N-oxide and an amount of water which makes possible the preparation of a solution at a moderate temperature having a substantially uniform composition, high solids content and a viscosity which can be tolerated in extrusion, spinning or other shaping process. It is believed that the water in the solvent causes swelling of the cellulose fibers to facilitate dissolution of the fibers in the solvent.

One advantage of including water in the tertiary amine N-oxide solvent to prepare a relatively high solid solution is that the resulting solution can be spun first into air and then submerged in a non-solvent to precipitate the cellulose. In other words, the process does not require wet spinning. Another advantage of mixing water with the tertiary amine N-oxide is that the mixed solvent can be used to prepare solutions at moderate temperatures of say 70°–100° C. which is below the melting point of many tertiary amine N-oxides.

Also as described in our earlier application, any suitable tertiary amine N-oxide solvent for cellulose may be used but N,N,N-triethylamine N-oxide or a tertiary amine N-oxide having a cyclic structure or pseudo-cyclic structure is preferred for the solvent for cellulose. It is postulated in the earlier application, without being bound by any theory, that the cyclic tertiary amine N-oxides contain a structure where the amine function can be either exo to the ring or endo, i.e., a part of the ring. In the former case, an N,N-dimethylamine function creates the structure necessary to provide solvency whereas in the latter case, a single methyl radical on the nitrogen atom is required for solvency. So far, best results have been obtained with a tertiary amine N-oxide having a high dipole moment of say at least about 4.5 Debyes.

Figure 1:
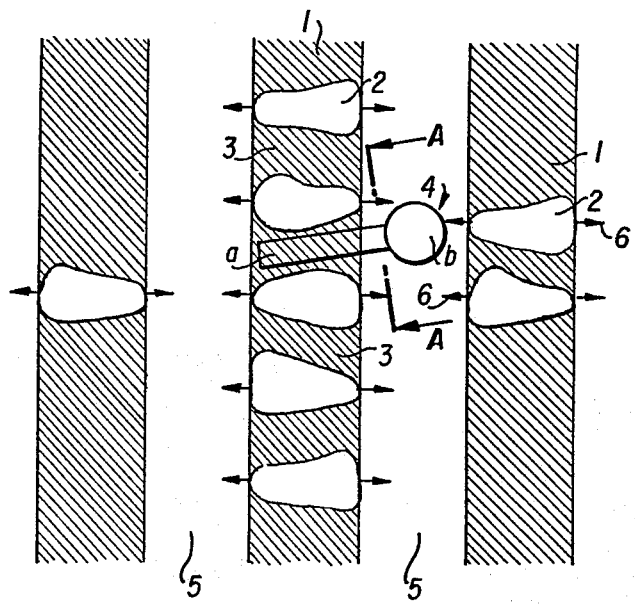
FIG. 1 is a schematic representation of the structure illustrating a theoretical explanation of the solvent action of a tertiary amine N-oxide on cellulose.

Philipp and co-workers, B. Philipp, H. Schleicher, and W. Wagenknecht, Chemicke Vlakna, XXV, 10, (1975), have described the interaction between cellulose and tertiary amine N-oxides as an electron donor-acceptor complex which seems to be in line with the observed behavior of tertiary amine N-oxides in cellulose, a representation of which is shown in FIG. 1. Sheets of cellulose are represented in FIG. 1 by planes 1 perpendicular to the plane of the sheet of the drawing (shaded) separated by a space 5. The sheets are comprised of molecular chains 2 extending longitudinally in a direction perpendicular to the sheet of the drawing separated by a gap 3 between adjacent chains. A molecule of a tertiary amine N-oxide solvent 4 for cellulose of the kind contemplated by the invention is graphically represented and has a hydrophobic portion "a" and a polar end "b". The arrows 6 represent the hydrogen bonding sites which give the polar region 5 its hydrophilic characteristics.

The dissolution of cellulose by certain tertiary amine N-oxides appears to require a molecular structure having a polar end "b" provided by the N—O dipole and a hydrophobic end "a" adapted to slide into the space between the cellulose chains.

The interaction between the N—O dipole and the cellulose hydroxyl group is believed to disrupt the hydrogen bonded portion of the cellulose structure, much as the N—O dipole is known to interact with other alcohols or water.

Figure 2:
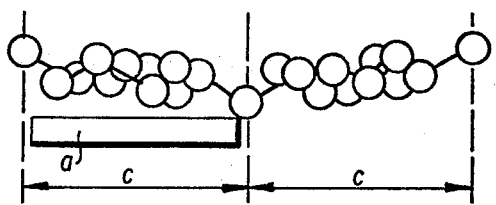
FIG. 2 is a schematic theoretical representation of a single anhydroglucose unit in a cellulose chain and a portion of the solvent molecule as viewed in the direction of the arrows A—A of FIG. 1.

With only one known exception to be noted later, the interaction between tertiary amine N-oxides and cellulose seems to require a cyclic structure to achieve solution with a dissolved solids content within the range contemplated by the invention. It is necessary to consider some postulated structures for the cellulose microfibril to rationalize this requirement. The simplest description that helps achieve this end is the structure suggested by J. O. Warwicker and A. C. Wright, J. Appl. Poly. Sci., 11, 659 (1967), a simplified version of which is shown in FIG. 2 in which the dimension "c" is the length of an anhydroglucose unit of the cellulose molecule, i.e., the distance between the hemiacetal oxygens in the cellulose chain. By referring to this structure, it is possible to distinguish the modes of action of the tertiary amine N-oxide between the relatively polar hydrogen bonded region 5 and the hydrophobic region 3 existing in the plane of the anhydroglucose residues (FIG. 1). The relative dimensions of the hydrophobic ring portion of the tertiary amine N-oxide molecule and the hydrophobic portion of the cellulose microstructure appear significant. The results obtained so far indicate that the width of the ring structure, in order to "fit" within the space 3 between the adjacent chains of cellulose molecules, should be smaller than the length of the anhydroglucose unit c, that is, less than about 5.15 Å.

Representative examples of the tertiary amine N-oxides which have been found so far to have solvency for cellulose when mixed with water as contemplated by the invention are N-methylhomopiperidine N-oxide, N-methylmorpholine N-oxide, N,N-dimethylcyclohexylamine N-oxide, N,N-dimethylbenzylamine N-oxide, N,N,N-triethylamine N-oxide, N,N-dimethylethanolamine N-oxide, 2(2-hydroxypropoxy)-N-ethyl-N,N-dimethyl amine N-oxide and N-methylpiperidine N-oxide.

The foregoing tertiary amine N-oxides may be represented by one of the following structures:

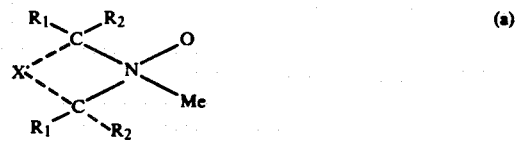

(a)

where X is a radical chain completing a ring comprising 2 to 4 carbon atoms, $R_1$ and $R_2$ are H or methyl (Me); or

(b)

wherein Z is (i) a saturated, unsaturated or an aromatic or 7-membered ring which may be substituted only by methyl at the $\beta$- or $\epsilon$-positions or (ii) $CH_2CH_2W$ where W can be OH, SH or $NH_2$.

Several tertiary amine N-oxides coming within the scope of the invention that do not have a true cyclic structure may be suitable as solvents for making high solids solutions of cellulose because they have a "pseudo-cyclic" structure. For instance, it has been found that N,N-dimethylethanolamine N-oxide can be used to advantage in practicing the invention. It may be represented by a "pseudo-cyclic" structure as follows:

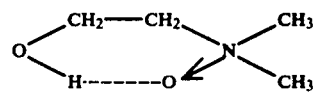

This molecule meets the spatial requirements postulated for the ring dimension to fit into the hydrophobic portion of the cellulose molecule. Moreover, so far it appears that N,N-dimethylamino-2-propanol N-oxide will not dissolve cellulose under the conditions of this invention and this observation would seem to lend support to the "pseudo-cyclic" structure proposed above in view of the larger dimension of the ring portion, i.e., greater than 5.15 Å, as follows:

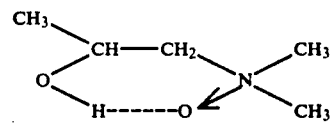

When these two compounds are viewed in the "pseudo-cyclic" representation, there is a close similarity to the N-methylmorpholine N-oxide series in which 2,6-dimethyl-N-methylmorpholine N-oxide is not an effective solvent for cellulose, although N-methylmorpholine N-oxide has the formula

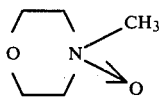

and 2,6-dimethyl-N-methyl morpholine N-oxide has the formula

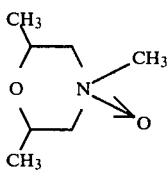

Another solvent, although marginal in its ability to dissolve cellulose, which can be explained by the pseudo-cyclic structure, is 2(2-hydroxypropoxy)-N-ethyl-N,N-dimethylamine N-oxide. The pseudo-cyclic structure proposed for this compound is:

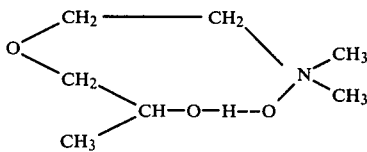

As indicated above, one exception of a suitable tertiary amine N-oxide that does not have a cyclic structure is N,N,N-triethylamine N-oxide. This tertiary amine N-oxide is an effective solvent for cellulose and can be used for practicing the invention even though it does not have a cyclic or pseudo-cyclic structure and even though it has been disclosed that this tertiary amine N-oxide does not act as a solvent for cellulose. The incorrect disclosure that it is not a solvent for cellulose might have been made because rearrangement, or conversion, at the recovery temperatures used (90°-95° C.) and low water content, of at least part of the N,N,N-triethylamine oxide to diethylhydroxylamine, had occurred. It has been found that cellulose can be dissolved in N,N,N-triethylamine N-oxide, if it contains from about 7-29% water and if the N,N,N-triethylamine N-oxide is prepared by adding 35% aqueous hydrogen peroxide to a mixture of N,N,N-triethylamine, methanol and an inorganic catalyst and the methanol and part of the water are removed under vacuum and at a moderate temperature of say 60°-65° C. to avoid rearrangement.

The percentage of water mixed with the tertiary amine N-oxide in the solvent for cellulose will vary from one tertiary amine N-oxide to the other in an amount of up to about 29% by weight based on the weight of the solution, and may be within the range of from about 1.4% to about 29% by weight based on the weight of the solution. The amount of cellulose that may be dissolved in the solvent in accordance with the invention is from about 2% to about 44%, preferably, about 10% to about 35% by weight based on the weight of the solution. With solvents in which the tertiary amine N-oxide is N-methylmorpholine N-oxide, the water content in the solvent may be up to about 22% by weight and the cellulose content may be up to about 38% by weight based on the total weight of the solution. The amounts of water to be included in the solvent and the amount of cellulose that can be dissolved in the solvent when it contains other tertiary amine N-oxides are as follows:

| Tertiary Amine N-oxide | % Water | % Cellulose |
| --- | --- | --- |
| N,N-dimethylethanolamine N-oxide | up to 12.5 | up to 31 |
| N,N-dimethylcyclohexylamine N-oxide | up to 21 | up to 44 |
| N-methylhomopiperidine N-oxide | 5.5–20 | 1–22 |
| N,N,N-triethylamine N-oxide | 7–29 | 5–15 |
| 2(2-hydroxypropoxy)-N-ethyl-N,N-dimethylamine N-oxide | 5–10 | 2–7.5 |
| N-methylpiperidine N-oxide | up to 17.5 | 5–17.5 |
| N,N-dimethylbenzylamine N-oxide | 5.5–17 | 1–20 |

With each of the tertiary amine N-oxides the amount of cellulose that can be dissolved will decrease substantially linearly as the water content is increased. The lower limit of water content is not always obtained by ordinary methods of removing water. For example, N,N,N-triethylamine N-oxide begins to decompose at below about 11% water.

An organic diluent may be used in quantities up to about 25% by weight of the total solution as an inexpensive diluent for the tertiary amine N-oxide or to lower the viscosity of the solution, if desired. Any suitable aprotic organic, liquid non-solvent for cellulose which will not react chemically with the tertiary amine N-oxide or cause degradation of the cellulose and have a high degree of polarity, i.e., a dipole moment greater than about 3.5 Debyes, will be suitable, such as, for example, dimethylsulfoxide, N,N-dimethylformamide, N,N-dimethylacetamide, N-methylpyrrolidinone, hexamethylphosphoric triamide, acetonitrile, sulfolane, or the like. Dipole moments of suitable organic, liquid diluents described above that can be used with tertiary amine N-oxide solvents are shown in the following table:

| Compound | Dipole Moment |
| --- | --- |
| N,N-dimethylformamide | 3.82 Debyes |
| N,N-dimethylacetamide | 3.79 Debyes |
| Dimethylsulfoxide | 3.98–4.3 Debyes |
| N-methyl-2-pyrrolidinone | 4.09 Debyes |
| Sulfolane | 4.69 Debyes |
| Acetonitrile | 3.84 Debyes |

Any suitable cellulose may be used in the process such as, for example, cotton linters or various grades of wood cellulose.

In the following examples, all parts and percentages are by weight unless otherwise stated.

EXAMPLE I

About 5.3 grams of rayon grade wood pulp (Buckeye V-68) containing about 6% water are mixed with about 46.3 grams of N,N-dimethylethanolamine N-oxide containing about 9.3% water and stirred for 16 minutes at 90° C. under a vacuum of 55 mm of mercury.

After standing for about 14 minutes at 90° C. the cellulose has completely dissolved. The resulting solution containing about 11% cellulose, about 82% of the tertiary amine N-oxide and 7% water, is extruded into water and washed with water until substantially free of the tertiary amine N-oxide.

EXAMPLE II

About 30 grams wood pulp Viscocell ELV containing about 6% water are suspended in about 127.5 grams N,N-dimethylcyclohexylamine N-oxide containing about 11.6% by weight water at about 80°–90° C. for about 70 minutes under a nitrogen blanket. The resulting solution is extruded into water and washed with water until substantially free of tertiary amine N-oxide. The precipitated cellulose thus obtained has a cuene viscosity at 0.5% concentration of 3.78.

EXAMPLE III

About 9.5 grams rayon grade wood pulp (V-68) containing about 6% water are suspended in about 41.9 grams N,N-dimethylethanolamine N-oxide containing about 9.3% by weight water, and homogenized for 13 minutes at about 90° C. and stirred continuously for about 30 minutes at 90° C. under a vacuum of 53 mm of mercury. The resulting solution, containing 20.5% cellulose, 78.1% of the tertiary amine N-oxide and 1.46% water, is spun into water to form a precipitated cellulose filament which is washed with water until substantially free of tertiary amine N-oxide.

EXAMPLE IV

About 7.1 grams of Buckeye V-60 cellulose containing about 6% water are suspended in about 40 grams N,N,N-triethylamine N-oxide containing about 14.7% by weight water and about 5 ml of methanol for 5 minutes at about 65°–70° C. The resulting swollen mass is transferred to a high shear mixer and homogenized at 60° C. for about 60 minutes.

The temperature is increased to 73° C. under a vacuum of 25 inches mercury and held for about 30 minutes to completely dissolve the cellulose. The solution is spun into water and the resulting filaments are washed substantially free of tertiary amine N-oxide and methanol with water. The precipitated cellulose has a cuene viscosity at 0.5% concentration of 5.12.

EXAMPLE V

About 36 grams of Buckeye V-60 pulp containing about 6% water, about 188.3 grams N,N,N-triethylamine N-oxide containing about 26.2% by weight water and about 10 ml of methanol are mixed together by the procedure described in Example IV. The mixing time under vacuum is about 1.5 hours at 70° C. to dissolve the cellulose. The solution contains about 11.2% water. The resulting solution is spun into water and the filaments are washed substantially free of tertiary amine N-oxide and methanol with water. The precipitated cellulose has a cuene viscosity at 0.5% concentration of 3.26.

EXAMPLES VI-1 through VI-54

The solubilities of cellulose in various tertiary amine N-oxides containing different concentrations of water and organic diluent are tabulated in Table I. In this table DMSO is an abbreviation for dimethylsulfoxide. "DMF" is an abbreviation for N,N-dimethylformamide, "A.O." refers to the tertiary amine N-oxides and "N.D." indicates that a value was "not determined".

Normally the solutions were prepared in test tubes with cellulose suspended in water and the tertiary amine N-oxide. Upon heating usually an initial swelling of the cellulose occurred. Observations were made on further heating and agitation as to the rapidity with which solution was achieved. The time limit imposed on the dissolving process was two hours. The cellulose was precipitated from the tertiary amine N-oxide solutions by pouring the solution into a aprotic non-solvent for cellulose such as water, washed and dried.

Whether or not the cellulose dissolved in the tertiary amine N-oxide and water is indicated in Table I by "yes" or "no" in the column under "Solution". In some cases, the formation of solution could be determined visually without the necessity for obtaining x-ray confirmation. In other cases, it was necessary to make x-ray measurements to state whether solution had occurred, as will be next explained.

Certain tertiary amine N-oxides, under proper conditions can cause disruption of the native cellulose I structure in order to form solutions of cellulose in the amine N-oxide. The nature of the interaction between the cellulose molecule and tertiary amine N-oxide has not been defined, but is thought to exist as a physicochemical complex. Upon addition of a protic substance to this solution, the complex is disrupted and a cellulose precipitate can be obtained. The cellulose I structure is thought to be a metastable moiety; hence the cellulose recovered from a solution will occur either in the cellulose II structure or as amorphous cellulose. This proposition is shown as Scheme I.

SCHEME I

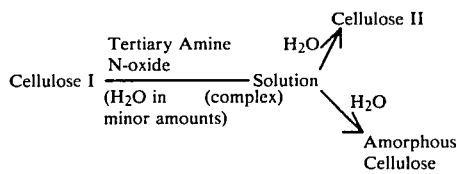

Each of the three cellulose structures described here have distinct x-ray diffraction patterns characterized by reflections at certain values of 2 θ. (Cf. O. Ellefsen and B.A. Tonnenson, in *High Polymers, Cellulose and Cellulose Derivatives*, ed. by N. M. Bikales and L. Segal, Vol. V., Part IV, p. 151, John Wiley, New York, 1971). Native cellulose (wood pulp or cotton) occurs in the cellulose I configuration; regenerated or precipitated cellulose fibers will have either the cellulose II or amorphous configuration or a mixture thereof. Thus, it is possible to measure whether or not changes have occurred in the native cellulose when subjected to tertiary amine N-oxide treatment by examining the precipitated cellulose samples and performing x-ray diffraction measurements on them. The form of the cellulose obtained with the solutions listed in Table I are indicated by the numeral I or II or Am (for amorphous) and the crystal order for the Cellulose I structure.

TABLE I

| | Ex. No. | % H₂O | % Cell. | Temp. °C. | X-ray Results Form (Crystal Order) | Solution |
|---|---|---|---|---|---|---|
| Dimethylcyclohexyl-amine Oxide | VI-1 | 16.7 | 5 | 90–95 | I + II | partial |
| | VI-2 | 16.7 | 10 | 90–95 | I + II | partial |
| | VI-3 | 14.75 | 5 | 90–95 | | Yes |
| | VI-4 | 14.75 | 10 | 90–95 | II . | Yes |
| | VI-5 | 14.75 | 15 | 90–95 | Not determined (N.D.) | Yes |
| | VI-6 | 14.75 (25% DMSO) | 5 | 103–108 | | Yes |
| | VI-7 | 14.75 (25% DMSO) | 10 | 103–108 | N.D. | Yes |
| | VI-8 | 10.9 | 5 | 95–100 | N.D. | Yes |
| | VI-9 | 10.9 | 10 | 95–100 | N.D. | Yes |
| | VI-10 | 4.5 | 22.87 | 110–120 | Decomposed | No |
| Triethylamine Oxide | VI-11 | 27–29 | 5 | 100 | N.D. | Yes |
| | VI-12 | 27–29 (25% DMSO) | 5 | 100 | N.D. | Yes |
| N-methylpiperidine Oxide | VI-13 | 25 | 5 | 80–90 | I | No |
| | VI-14 | 17.5 | 5 | 115–120 | II | Yes |
| | VI-15 | 17.5 | 10 | 115–120 | II | Yes |
| | VI-16 | 14.05 | 5 | 95–100 | II + Am. | Yes |
| | VI-17 | 14.05 | 10 | 95–100 | II | Yes |
| N-methylpiperidine Oxide | VI-18 | 9 | 16 | 105–120 | II | Yes |
| | VI-19 | 2.6 (calc.) | 17.5 | 105–120 | II | Partial |
| N-methylmorpholine Oxide | VI-20 | 19.9 | 5 | 90–95 | I (0.92) | No |
| | VI-21 | 19.9 | 10 | 90–95 | I (0.93) | No |
| | VI-22 | 17.7 | 5 | 90–95 | | Yes |
| | VI-23 | 17.7 | 10 | 90–95 | I + II | Partial |
| | VI-24 | 24.27 | 5 | 105–112 | I (0.94) | No |
| | VI-25 | 24.27 | 10 | 110–112 | I (0.93) | No |
| | VI-26 | 15.5 | 5 | 100–105 | Amorphous | Yes |
| | VI-27 | 15.5 | 10 | 100–105 | Amorphous | Yes |
| | VI-28 | 5.53 | 22.6 | 110–120 | II | Yes |
| N-methylhomo-piperidine Oxide | VI-29 | 17.8 (80:20 A.O.:DMF) | 10 | 65–70 | N.D. | Yes |
| | VI-30 | 23.9 | 5 | 105–110 | I (0.94) | No |
| | VI-31 | 23.09 | 10 | 105–110 | I (0.94) | No |
| N-methylhomo-piperidine Oxide | VI-32 | 11.28 | 5 | 105–110 | II | Yes |
| | VI-33 | 11.28 | 10 | 105–110 | II | Yes |
| | VI-34 | 20.0 | 5 | 85–100 | II | Yes |
| | VI-35 | 20.0 | 10 | 85–100 | II | Yes |
| Dimethylethanol-amine Oxide | VI-36 | 15 | 5 | 80–85 | I (0.94) | No |
| | VI-37 | 15 | 10 | 80–85 | I (0.93) | No |
| | VI-38 | 15 | 5 | 100–105 | I (0.91) | No |
| | VI-39 | 15 | 10 | 100–105 | I (0.93) | No |
| | VI-40 | 14.8 | 5 | 80–85 | I | No |
| | VI-41 | 14.8 | 10 | 80–85 | I | No |
| | VI-42 | 11.3 | 5 | 80–85 | II + Amorphous | Yes |
| | VI-43 | 11.3 | 10 | 80–85 | II + Amorphous | |
| | VI-44 | 10.2 | 5 | 80–85 | II | Yes |
| | VI-45 | 10.2 | 10 | 80–85 | II + Amorphous | Yes |
| | VI-46 | 6 | 15 | 95–120 | II | Yes |
| | VI-47 | 3.5 | 16.5 | 95–120 | — | Yes |
| Dimethylbenzyl-amine Oxide | VI-48 | 16.76 (75:25 A.O.:DMF) | 10 | 75–80 | Not Determined | Yes |
| | VI-49 | 32.2 | 10 | 80–90 | N.D. | No |
| | VI-50 | 16.83 | 5 | 105–110 | I (0.95) | No |
| | VI-51 | 16.83 | 10 | 105–110 | I (0.95) | No |
| | VI-52 | 13.04 | 5 | 105–110 | Amorphous | Yes |
| | VI-53 | 13.04 | 10 | 105–110 | Amorphous | Yes |
| | VI-54 | 5.5 | 15 | 115–120 | N.D. | Yes |

EXAMPLE VII

Figure 3:
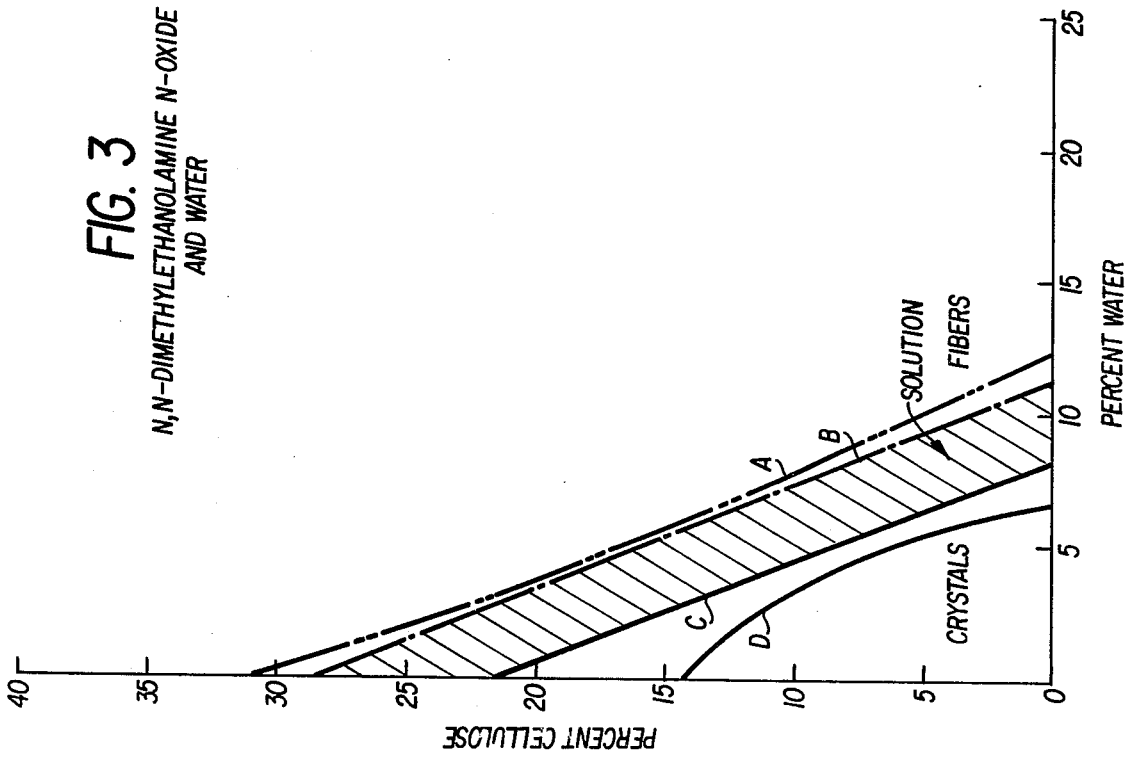
FIG. 3 is a diagram illustrating the solubility of cellulose in one of the solvents containing N,N-dimethylethanolamine N-oxide provided by the invention.

The solubility of cellulose in N,N-dimethylethanolamine N-oxide is diagrammatically illustrated in FIG. 3. In determining data for FIG. 3 about 5.3 parts of Buckeye V-68 pulp containing about 6% by weight water was suspended in about 282.8 parts N,N-dimethylethanolamine N-oxide containing about 29.3% water at about 75° C. The mixture was homogenized in an Atlantic Research 2CV mixer at about 72° C., for 15 minutes at 200 RPM. A vacuum of about 25 mm mercury was applied to the homogenized mixture to remove water until crystallization of the tertiary amine N-oxide began. The following samples were taken at intervals as water was removed under vacuum. The composition of the sample and the structure of the cellulose were determined. The state of the transformation of the cellulose was characterized. Samples of the mixture were examined under a microscope and a photograph was made of the mixture to determine whether undissolved cellulose fibers and crystals of the tertiary amine N-oxide were present in the solution.

Sample 1, taken 15 min. after homengenization:

Description: Fibers visible.
Photograph: Long fibers visible
Analysis: % amine N-oxide: 69.3; % cellulose: 1.1; % water (by amine N-oxide titration): 29.6; % water (by Brabender Aqua-tester): 29.8.
Structure: Cellulose I Sample 2, taken 70 minutes after the vacuum was applied:

Description: Opaque, gel like, low viscosity material with light color.
Photograph: Short fibers and several long fibers were present.
Analysis: % amine N-oxide: 84.6; % cellulose: 2.0; % water (titration) 13.4; % water (Brabender): 13.75.
Structure: Cellulose II was dominant.

Sample 3, taken 90 min. after the vacuum was applied:

Description: Slightly gel-like and opaque with good elongation* and light color.
Photograph: A few short fibers visible.
Analysis: % amine N-oxide: 86.0; % cellulose: 2.1; % water (titration): 11.9; % water (Brabender): 11.9.
Structure: Cellulose II was dominant.
* Indicates good drawability of the cold solution. Determined by stretching a cooled glob or lump of the solution.

Sample 4, taken 95 min. after vacuum applied:

Description: Clear, light, low viscous solution with very good elongation.
Photograph: Clear indicating that all cellulose fibers had dissolved.
Analysis: % amine N-oxide: 87.7; % cellulose: 2.2; % water (titration): 10.1; % water (Brabender): 10.6.
Structure: Cellulose II.

Sample 5, taken 140 min. after the vacuum was applied:

Description: Clear, light solution which crystallized rapidly after cooling. Elongation not as good as with sample 4.
Photograph: Crystals of tertiary amine N-oxide were visible.
Analysis: % amine N-oxide: 91.7; % cellulose: 2.3; % water (titration): 6.1; % water (Brabender): 6.95.
Structure: Cellulose II.

EXAMPLE VIII

Example VII was repeated except about 38.3 parts ground Buckeye V-68 pulp containing about 6% water, 169.7 parts N,N-dimethylethanolamine N-oxide containing about 29.9% water (by titration) were used as starting materials.

Sample 1—taken after homogenizing for 15 minutes.

Description: mixture crumbly
Photograph: long fibers present
Analysis:
 % amine N-oxide: 57.1
 % cellulose: 17.3
 % water (titration): 25.6
 % water (Brabender): 25.2
Structure: Cellulose I Sample 2—taken 60 minutes after vacuum was applied.

Description: dull opaque, extremely viscous, gumlike material with tan color. No elongation.
Photograph: fibrous
Analysis:
 % amine N-oxide: 72.4
 % cellulose: 22.9
 % water (titration) 4.7
 % water (Brabender) 5.1
Structure: Cellulose II was dominant Sample 3—taken 80 minutes after vacuum was applied.

Description: very dark, however bright, extremely viscous mixture with good elongation. Few cellulose particles present
Photograph: clear
Analysis:
 % amine N-oxide 74.2
 % cellulose: 23.4
 % water (titration): 2.4
 % water (Brabender): 2.95
Structure: Cellulose II Sample 4—taken 90 minutes after vacuum was applied.

Description: very dark, extremely viscous, gum-like solution with excellent elongation.
Photograph: no fibers present. Sample turns opaque rapidly.
Analysis: P1 % amine N-oxide: 74.8
 % cellulose: 23.8
 % water (titration): 1.4
 % water (Brabender): 1.9
Structure: Cellulose II Sample 5—taken 135 minutes after vacuum was applied.

Description: solution black gum-like, opaque solution still with excellent elongation.
Photograph: no fibers present
Analysis:
 % amine N-oxide: 74.9
 % cellulose: 24.3
 % water (titration): 0.9
 % water (Brabender): 1
Structure: Cellulose II present Data obtained by the process of Examples VII and VIII were analyzed by regression analysis to obtain the points for lines B and C for FIG. 3.

FIG. 3 is a diagrammatic illustration of the characteristics of mixtures of water, N,N-dimethylethanolamine N-oxide and cellulose. The lines A and D are the 95% confidence lines determined from lines B and C and were obtained from experiments recorded in Table II.

The percent cellulose is indicated along the ordinate and the percent water is shown on the abscissa.

The technique of linear least squares regression was used in analyzing the data to define the regions between the lines. This technique involves fitting a straight line to the data collected.

Since there is a certain amount of random variation in any laboratory data, few if any of the data points fall exactly on the lines. There are a number of criteria which could be used to find the "best" fit of the line to the data. The method used in the analysis of the data for FIG. 3 is called "least squares".

For a given fit to the data, each of the data points lies a certain vertical distance from the line. This distance is called the residual error or deviation of the data point from the line. The line for which the sum of the squares of these deviations is a minimum is said to be the least squares fit on the least squares regression line.[1]

[1] A complete discussion of least squares regression can be found in many statistical texts such as *Applied Regression Analysis* by N. R. Draper and H. Smith, 1966 (John Wiley and Sons, Inc., New York, London, Sydney).

In practice the least squares regression line is found using computer software. For this analysis the GLM (General Linear Models) procedure of the "SAS" statistical program library implemented on an IBM 370/158 computer was used.[2] The "Simple Regressions" program of Tektronix Plot 50 Statistics Volume 1 implemented on a Tektronix 4051 Graphic System was also used.[3] Both programs use the same statistical technique.

[2] A complete discussion of the GLM procedure is found in *A User's Guide to SAS 76* by Anthony J. Barr, James H. Goodnight, John P. Sall, and Jane T. Helwig, 1976 (SAS Institute, Inc., P.O. Box 10066, Raleigh, NC 27605).

[3] A discussion of this program is found in *Plot 50 Statistics Volume 1*, 1975 (Tektronix, Inc., Beaverton, OR 97005).

The line B represents the concentrations of water and cellulose at the points where complete solution was first seen in a photograph of a sample of the mixture. Solutions containing relative amounts of cellulose and water at points to the right of the line B would be expected to have some undissolved cellulose fibers suspended therein. The line A, however, is the upper 95% confidence line of B indicating that solutions containing cellulose and water in the relative amounts falling at points between lines A and B are free from fibers 95% of the time which fibers become increasingly more prevalent to the right of line A.

Solutions within the area between lines B and C are free from cellulose fibers and are also free from crystals of N,N-dimethylethanolamine N-oxide. The line C represents the points when crystals were first observed in the solution.

To the left of the line C, the solution would be expected to contain some crystals of N,N-dimethylethanolamine N-oxide. Line D is the lower 95% confidence of line C. Ninety-five percent of the solutions in the area between lines C and D would be expected to be free from crystals while the solutions having water and cellulose concentrations to the left of line D would contain crystals. Solutions between lines B and C are spinnable and extrudable while solutions to the right and left thereof would be expected to present some problem in spinning or extruding because of the presence of solid material which would cause flaws in the product.

The equations estimating the various transformations obtained from regression analysis are as follows together with the upper and lower 95% confidence region, and the correlation coefficient R:

Solution, First Time Observed (Line B FIG. 3)

$B = 28.62 - 2.57(\% \ H_2O \ titr); \ R = 0.984$
$A = B + 1.23\sqrt{0.61 + 0.10 \ (\% \ H_2O \ titr - 5.66)^2}$
A and B are % cellulose Crystals, First Time Observed (Line C FIG. 3)

$C = 21.59 - 2.59(\% \ water \ titr.); \ R = 0.908$
$D = C - 2.05\sqrt{1.29 + 0.58 \ (\% \ water \ titr. - 4.41)^2}$
C and D are % cellulose

TABLE II

DATA FROM EXPERIMENTS INVOLVING N, N-DIMETHYLETHYANOLAMINE N-OXIDE

| Analysis Sample No. | Solution, First Time Observed | | | Solution | | | Crystals, First Time Observed | | | Dissolving Temp. (°C.) |
|---|---|---|---|---|---|---|---|---|---|---|
| | % Amine N-Oxide | % Cellulose | % H$_2$O | % Amine N-Oxide | % Cellulose | % H$_2$O | % Amine N-Oxide | % Cellulose | % H$_2$O | |
| 10 | 77.0 | 20.3 | 2.7 | 77.5 | 20.7 | 1.8 | — | — | — | 90–94 |
| 11 | 76.4 | 20.4 | 3.2 | 77.4 | 20.7 | 1.9 | — | — | — | 72 |
| 12 | 82.3 | 10.3 | 7.4 | 83.2 | 10.5 | 6.3 | — | — | — | 72 |
| 13 | 78.8 | 15.4 | 5.8 | — | — | — | 79.9 | 15.6 | 4.5 | 72 |
| 14 | 86.0 | 5.8 | 8.2 | — | — | — | 88.3 | 6.0 | 5.7 | 72 |
| 15 | 78.5 | 17.2 | 4.3 | 79.3 | 17.3 | 3.4 | — | — | — | 72 |
| 16 | 74.8 | 23.8 | 1.4 | 74.9 | 24.3 | 0.9 | — | — | — | 72 |
| 17 | 81.6 | 12.0 | 6.4 | — | — | — | 83.4 | 12.4 | 4.3 | 72 |
| 18 | 74.4 | 22.2 | 3.5 | 75.0 | 22.5 | 2.6 | — | — | — | 72 |
| 19 | 87.7 | 2.2 | 10.1 | — | — | — | 91.7 | 2.3 | 6.1 | 72 |
| 20 | 82.4 | 10.4 | 7.2 | — | — | — | 84.7 | 10.8 | 4.5 | 90–94 |
| 21 | 79.6 | 15.3 | 5.2 | — | — | — | 82.5 | 15.4 | 2.1 | 90–94 |
| 22 | 83.1 | 8.0 | 8.1 | — | — | — | 85.6 | 8.4 | 6.0 | 72 |

EXAMPLE IX

The process of Example VII was repeated except the solvent was N,N-dimethylcyclohexylamine N-oxide and the following starting materials and amounts were used:

4.2 g ground Buckeye V-68 pulp containing about 6% water by weight was dissolved in 240 g N,N-dimethylcyclohexylamine N-oxide containing about 39.7% water by weight (titrated) at a temperature of 87° C. Vacuum was applied as in Example VII at about 22 mm Hg. The following samples were taken:

Sample 1—taken after homogenizing for 15 minutes.

Description: fibrous mass
Photograph: fibers present
Analysis:
  % amine N-oxide: 59.2
  % cellulose: 1.7
  % water (titrated): 39.1
  % water (Brabender): 39.4
Structure: Cellulose I Sample 2—taken 25 minutes after vacuum applied.

Description: solution was only slightly gel-like, extremely low viscosity, very few short fibers were seen at first but they dissolved during picture taking.
Photograph: clear
Analysis:
  % amine N-oxide: 79.7
  % cellulose: 2.2
  % water (titrated): 18.1
  % water (Brabender): 18.6
Structure: Cellulose II dominant Sample 3—taken 30 minutes after vacuum applied.

Description: clear, extremely low viscosity solution
Photograph: clear indicating no fibers or crystals were present
Analysis:

% amine N-oxide: 82.3
% cellulose: 2.3
% water (titrated): 15.4
% water (Brabender): 13.9
Structure: Cellulose II Sample 4—taken 45 minutes after vacuum applied.

Figure 4:
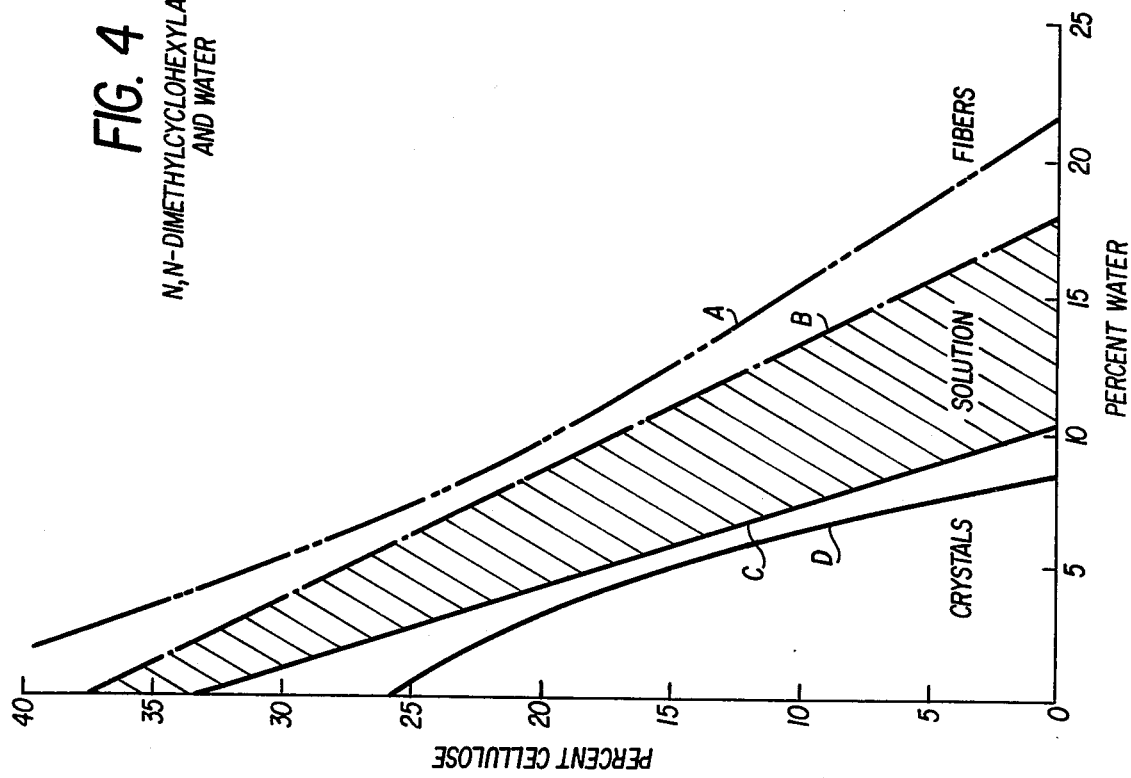
FIG. 4 is a diagram illustrating the solubility of cellulose in a solvent containing N,N-dimethylcyclohexylamine N-oxide provided by the invention.

Description: solution was opaque and contained crystallized material with low viscosity.
Photograph: crystals could be seen. Under the hot stage microscope the crystals melted at 124° C. and started decomposing.
Analysis:
% amine N-oxide: 88.7
% cellulose: 2.3
% water (titrated): 7.95
% water (Brabender): 7.1
Structure: Cellulose II
Solubility of cellulose in N,N-dimethylcyclohexylamine N-oxide is illustrated in FIG. 4.

EXAMPLE X

Example IX is repeated with the following starting materials:

37.2 g ground Buckeye V-68 pulp containing 6% water by weight and 120 g N,N-dimethylcyclohexylamine N-oxide containing 39.7% water by weight. Dissolving temperature 110° C., vacuum 18 mm Hg.

Sample 1—taken after homogenizing for 15 minutes.
Description: fibrous mass
Photograph: fibrous mass
Analysis:
% amine N-oxide: 46.1
% cellulose: 22.3
% water (titrated): 31.6
% water (Brabender): 31.9
Structure: Cellulose I Sample 2—taken 15 minutes after vacuum applied.
Description: amber colored, almost clear, extremely viscous liquid with excellent elongation
Photograph: 2–3 short fibers which do not show up using polarized light
Analysis:
% amine N-oxide: 64.1
% cellulose: 29.4
% water (titrated): 6.5
% water (Brabender): 6.2
Structure: Cellulose II dominant Sample 3—taken 20 minutes after vacuum applied.

Description: amber colored, opalescent, extremely viscous solution with still an excellent elongation
Photograph: clear
Analysis:
% amine N-oxide: 64.5
% cellulose: 32.9
% water (titrated): 2.6
% water (Brabender): 2.5
Structure: Cellulose II Sample 4—taken 25 minutes after vacuum applied.

Description: dark, foam-like material with substantial number of gas bubbles. Decomposition point: 110° C.
Photograph: viscous liquid with gas bubbles
Analysis:
% amine N-oxide: 64.8
% cellulose: 34.95
% water (titrated): 0.22
% water (Brabender): 0.8
Structure: Cellulose II The data for FIG. 4 were obtained with N,N-dimethylcyclohexylamine N-oxide by regression analysis as described above of the results of experiments (see Table III) practicing the process of Examples IX and X with various concentrations of cellulose and water. The lines A, B, C and D correspond in meaning to those of FIG. 3.

The equations used for FIG. 4 are as follows:

Solution, First Time Observed (Line B)

$B = 37.45 - 2.10\ (\%\ \text{water titr}); R = 0.972$
$A^* = B_1 + 2.63\sqrt{1.05 + 0.05\ (\%\ \text{water titr.} - 9.78)^2}$
* Upper 95% confidence line Crystals, First Time Observed (Line C)

$C = 33.57 - 3.28\ (\%\ \text{water titr}); R = 0.945$
$D^{**} = C - 3.12\sqrt{1.05 + 0.18\ (\%\ \text{water titr.} - 5.28)^2}$
** Lower 95% confidence line

TABLE III

DATA FROM EXPERIMENTS INVOLVING N,N-DIMETHYLCYCLOHEXYLAMINE N-OXIDE

| Analysis Sample No. | Solution, First Time Observed | | | Solution | | | Crystals, First Time Observed | | | Dissolving Temp. (°C.) |
|---|---|---|---|---|---|---|---|---|---|---|
| | % Amine N-Oxide | % Cellulose | % H$_2$O | % Amine N-Oxide | % Cellulose | % H$_2$O | % Amine N-Oxide | % Cellulose | % H$_2$O | |
| 23 | 67.9 | 24.8 | 7.3 | 68.7 | 25.0 | 6.3 | 72.0 | 25.4 | 2.6 | 87 |
| 24 | 67.5 | 28.1 | 4.5 | — | — | — | 68.7 | 29.9 | 1.5 | 87 |
| 25 | 72.4 | 20.4 | 7.2 | — | — | — | 74.5 | 20.5 | 5.0 | 87 |
| 26 | 72.2 | 15.5 | 11.3 | — | — | — | 78.7 | 15.8 | 5.5 | 87 |
| 27 | 76.2 | 10.8 | 13.0 | 76.4 | 11.4 | 12.2 | 80.1 | 12.3 | 7.6 | 87 |
| 28 | 81.9 | 4.7 | 13.4 | 82.4 | 5.0 | 12.6 | 85.5 | 5.6 | 9.0 | 87 |
| 29 | 79.7 | 2.2 | 18.1 | 82.3 | 2.3 | 15.4 | 88.7 | 2.3 | 8.0 | 87 |
| 30 | 64.5 | 32.9 | 2.6 | — | — | — | — | — | — | 110 |
| 31 | 76.3 | 13.1 | 10.6 | 77.5 | 13.6 | 9.0 | 80.9 | 13.9 | 5.2 | 110 |

EXAMPLE XI

Figure 5:
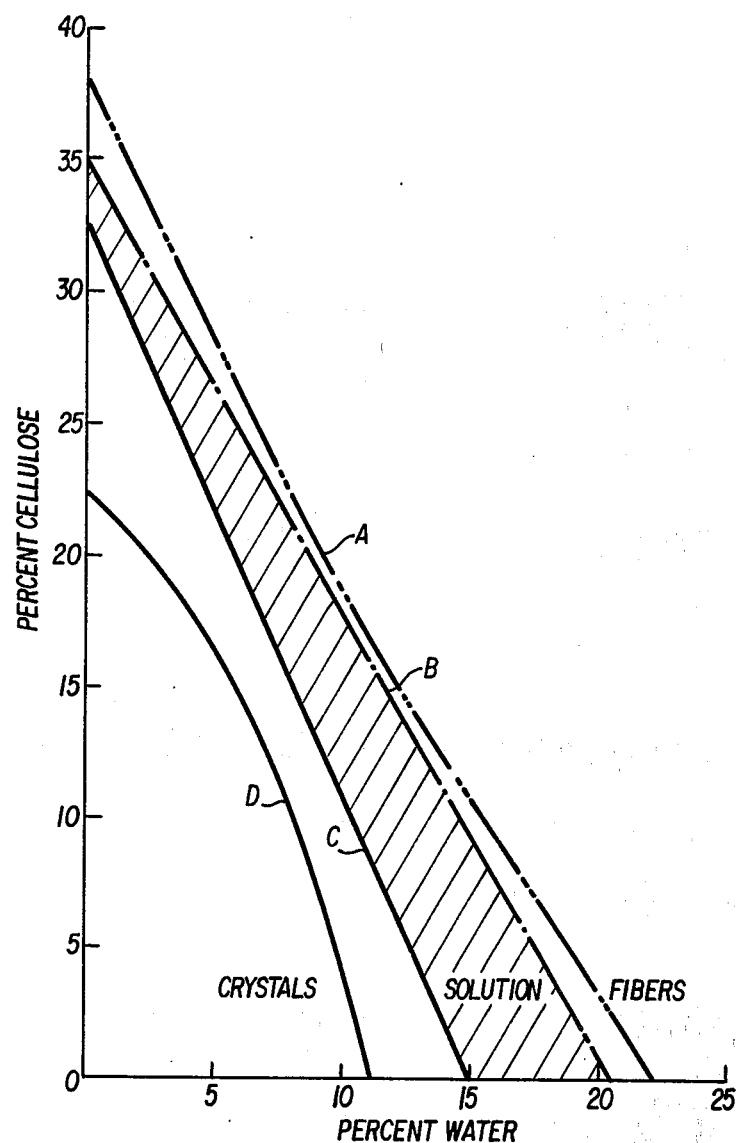
FIG. 5 is a diagram illustrating the solubility of cellulose in a solvent containing N-methylmorpholine N-oxide provided by the invention.

The solubility of cellulose (ground Buckeye V-68 wood pulp) in N-methylmorpholine N-oxide and various concentrations of water is diagrammatically illustrated in FIG. 5. The data for the diagram were obtained by the same procedure as in Example VII as follows:

About 2.1 grams of ground Buckeye V-68 wood pulp cellulose containing about 6% by weight water were suspended in about 100 g N-methylmorpholine N-oxide containing about 28% water at about 75° C. The mixture was homogenized in an Atlantic Research 2CV mixer at about 94°–95° C. for 15 minutes at 200 rpm. Then a vacuum of about 20 mm Hg was applied to remove water until crystallization of the mixture started. During this procedure, samples were taken to determine the composition, the cellulose structure and to characterize the state of transformation. The composition was analyzed for percent water by Brabender Aquatester, for percent cellulose by precipitating in water, washing, drying, and determining the cellulose content gravimetrically, for percent amine N-oxide by titration. The cellulose structure was determined indirectly by precipitating the sample in water, washing, drying the precipitate and determining its structure by wide-angle x-ray diffraction. The characterization of the state of transformation was done optically using a transmission microscope and taking microphotographs.

Sample 1—taken after homogenizing the mixture for 15 minutes.

Description: Fibrous mass
Photograph: fibrous mass
Analysis:
 % amine N-oxide: 71.4
 % cellulose: 1.95
 % water (Brabender): 26.6
Structure: Cellulose I present Sample 2—taken 5 minutes after vacuum was applied.

Description: solution is opaque
Photograph: fibers visible
Analysis:
 % amine N-oxide: 74.2
 % cellulose: 1.96
 % water (by Brabender): 23.2
Structure: Cellulose I present Sample 3—taken 7 minutes after vacuum was applied.

Description: opaque solution
Photograph: few small fibers visible
Analysis:
 % amine N-oxide: 78.4
 % cellulose: 2.1
 % water (Brabender): 19.4
Structure: Cellulose is predominantly II Sample 4—taken 10 minutes after vacuum was applied.

Description: solution clear
Photograph: no fibers visible
Analysis:
 % amine N-oxide: 80.1
 % cellulose: 2.4
 % water (by Brabender): 17.8
Structure: Cellulose II Sample 5—taken 20 minutes after vacuum was applied.

Description: opaque solution
Photograph: no fibers visible
Analysis:
 % amine N-oxide: 83.1
 % cellulose: 3.2
 % water (by Brabender): 13.5
Structure: Cellulose II

EXAMPLE XII

Example XI is repeated except 38.3 g ground Buckeye V-68 cellulose containing about 6% water and 150 g N-methylmorpholine N-oxide containing about 26.5% water (by Brabender) were used in preparing a solution.

Sample 1—taken after homogenizing for 15 minutes.

Description: crumbly
Photograph: fibrous mass
Analysis:
 % tertiary amine N-oxide: 57.5
 % cellulose: 19.3
 % water (by Brabender): 23.3
Structure: Cellulose I Sample 2—taken 10 minutes after vacuum applied.

Description: mixture is opaque
Photograph: fibrous mass visible
Analysis:
 % amine N-oxide: 64.5
 % cellulose: 20.0
 % water (by Brabender): 13.6
Structure: Cellulose I Sample 3—taken 15 minutes after vacuum applied.

Photograph: few fibers visible
Analysis:
 % amine N-oxide: 66.3
 % cellulose: 22.4
 % water (by Brabender): 11.3
Structure: Cellulose II Sample 4—taken 20 minutes after vacuum applied.

Description: solution is clear
Photograph: no fibers visible
Analysis:
 % amine N-oxide: 70.9
 % cellulose: 22.7
 % water (by Brabender): 6.0
Structure: Cellulose II Sample 5—taken 30 minutes after vacuum applied.

Description: clear solution
Photograph: no fibers visible
Analysis:
 % amine N-oxide: 71.6
 % cellulose: 23.8
 % water (by Brabender): 4.3
Structure: Cellulose II Sample 6—taken 45 minutes after vacuum is applied.

Description: clear solution
Photograph: shows small number of amine N-oxide crystals. Solution crystallizes rapidly when subjected to pressure.
Analysis:
 % amine N-oxide: 72.2
 % cellulose: 23.8
 % water (by Brabender): 3.8
Structure: Cellulose II Sample 7—taken 54 minutes after vacuum is applied.

Description: similar to that of Sample 6
Photograph: similar to that of Sample 6
Analysis:
 % amine N-oxide: 72.9
 % cellulose: 24.4
 % water (by Brabender): 2.8
Structure: Cellulose II The data for FIG. 5 was obtained experimentally with N-methylmorpholine N-oxide by regression analysis based on results obtained practicing the process of Examples XI and XII. The regression analysis was made by the procedure described with respect to Examples VII and VIII.

The equations used for FIG. 5 are as follows:
N-methylmorpholine N-oxide

Solution, first time observed (line B)

$B = 34.69 - 1.695 \, (\%H_2O \text{ titr})$ $A = 34.69 - 1.695 \, (\%H_2O \text{ titr}) + 0.81\sqrt{1.65 + 0.1(\%H_2O \text{ titr} - 12.76)^2}$ Crystals, first time observed (line C)

$C = 32.38 - 2.21 \, (\%H_2O \text{ titr})$ $D = 32.38 - 2.21 \, (\%H_2O \text{ titr}) - 2.97\sqrt{2.31 + 0.21(\%H_2O \text{ titr} - 6.53)^2}$ The above equations were determined by regression analysis based on the results in Table IV.

TABLE IV

DATA FROM EXPERIMENTS INVOLVING N-METHYLMORPHOLINE N-OXIDE

| Analysis Sample No. | Solution, First Time Observed | | | Solution | | | Crystals, First Time Observed | | | Dissolving Temp. (°C.) |
|---|---|---|---|---|---|---|---|---|---|---|
| | % Amine N-Oxide | % Cellulose | % H₂O | % Amine N-Oxide | % Cellulose | % H₂O | % Amine N-Oxide | % Cellulose | % H₂O | |
| 1 | 80.1 | 2.4 | 17.8 | — | — | — | | | | 94–95 |
| 2 | 75.2 | 7.0 | 17.0 | 76.1 | 7.2 | 15.8 | 80.8 | 7.6 | 12.2 | 94–95 |
| 3 | 70.9 | 21.0 | 7.8 | 70.9 | 22.6 | 4.5 | 72.6 | 23.3 | 3.8 | 94–95 |
| 4 | 70.9 | 22.7 | 6.0 | 71.6 | 23.8 | 4.3 | 72.2 | 23.8 | 3.8 | 94–95 |
| 5 | 73.3 | 13.0 | 12.4 | 74.0 | 12.9 | 12.0 | 78.1 | 13.5 | 7.6 | 94–95 |
| 6 | 75.7 | 10.5 | 13.8 | 79.9 | 10.8 | 8.7 | 81.3 | 10.9 | 6.6 | 94–95 |
| 7 | 71.5 | 18.1 | 9.8 | — | — | — | 76.8 | 19.2 | 4.9 | 110–117 |
| 8 | 71.5 | 18.8 | 9.5 | 72.6 | 19.5 | 7.8 | 76.0 | 19.7 | 4.2 | 110–117 |
| 9 | 75.7 | 10.9 | 13.0 | 80.5 | 11.4 | 7.8 | 81.1 | 11.9 | 6.8 | 110–117 |

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In a process for dissolving cellulose in a tertiary amine N-oxide solvent for the cellulose and thereafter shaping the solution and separating the cellulose from the tertiary amine N-oxide, the improvement wherein a solution containing up to about 44% cellulose is prepared in a solvent for the cellulose comprising a tertiary amine N-oxide and from 0.8% to about 29% by weight of water wherein the maximum water content in the solvent decreases substantially linearly with increase in cellulose content.

2. The process of claim 1 wherein the solution additionally contains an aprotic, organic, liquid, diluent which is compatible with the tertiary amine N-oxide and has a dipole moment larger than about 3.5 Debyes.

3. The process of claim 1 wherein the solvent is selected from the group consisting of N-methylmorpholine N-oxide with from about 5.5% to about 22% water, N,N-dimethylethanolamine N-oxide with from about 1.4% to about 12.5% water, N,N-dimethylbenzylamine N-oxide with from about 5.5% to about 17% water, N-methylhomopiperidine N-oxide with from 5.5% to about 20% water, N,N,N-triethylamine N-oxide with from about 7% to about 29% water, N,N-dimethylcyclohexylamine N-oxide with from 0.8% to about 21% water, N-methylpiperdine N-oxide with from about 2.6% to about 17.5% water and 2(2-hydroxypropoxy)-N-ethyl-N,N-dimethylamine N-oxide with from 5% to about 10% water.

4. The process of claim 1 wherein the solvent comprises N-methylmorpholine N-oxide and from about 5.5% to about 22% water.

5. The process of claim 1 wherein the solvent comprises N,N-dimethylethanolamine N-oxide and from about 1.4% to about 12.5% water.

6. The process of claim 1 wherein the solvent comprises N,N-dimethylcyclohexylamine N-oxide and from 0.8% to about 21% water.

7. In a process for dissolving cellulose in a tertiary amine N-oxide solvent for the cellulose and thereafter shaping the solution and separating the cellulose from the tertiary amine N-oxide, the improvement wherein the solution is prepared with a solvent for the cellulose comprising a tertiary amine N-oxide selected from the group consisting of:
(a) N,N,N-triethylamine N-oxide and
(b) tertiary amine N-oxides having one or two of the valence bonds of the nitrogen substituted by a methyl residue and, where one methyl residue is present, the remaining valences are satisfied by a divalent radical forming a 5- to 7-membered ring structure having the N-atom in the ring; where two methyl residues are present, the remaining valence is satisfied by
  (1) a monovalent cyclic 5-, 6- or 7-membered residue which may be substituted only by methyl residues at the β- or ε-positions, or
  (2) by a radical which can form a pseudo-cyclic structure through interaction with the N-oxide functionality, and
from 0.8% to about 29% by weight of water wherein the maximum water content in the solvent decreases substantially linearly with increase in cellulose content.

8. In a process which comprises dissolving cellulose in a tertiary amine N-oxide solvent for the cellulose and thereafter shaping the solution and separating the cellulose from the tertiary amine N-oxide, the improvement wherein the solution is prepared with a solvent for the cellulose comprising
(1) a tertiary amine N-oxide having one of the following structures:

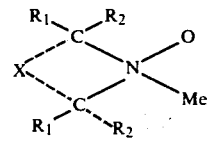

(a)

where X is a radical chain completing a ring comprising 2 to 4 carbon atoms, $R_1$ and $R_2$ are H or methyl (Me);

wherein Z is (i) a saturated or aromatic, unsaturated 5-, 6- or 7-membered ring which may be substituted only by methyl at the β- or ε-positions; or (ii) CH₂CH₂W where W can be OH, SH or NH₂, or (2) N,N,N-triethylamine N-oxide and from about 0.8% to about 29% by weight of water wherein the maximum water content in the solvent decreases substantially linearly with increase in cellulose content.

9. In a process for making a shaped cellulosic article which comprises preparing a tertiary amine N-oxide solution containing dissolved cellulose, the improvement which comprises dissolving cellulose in a solvent containing a tertiary amine N-oxide selected from the group consisting of N,N,N-triethylamine N-oxide and a tertiary amine N-oxide having a cyclic or pseudo-cyclic structure including a ring having a width less than about 5.15 Å and a molecule having a dipole moment of at least about 4.5 Debyes mixed with an amount of water which liquefies the tertiary amine N-oxide at a temperature below its melting point and within the range of from 0.8% to about 29% by weight water based on the weight of the solvent to prepare a solution containing up to about 44% dissolved cellulose, the larger percentage of water being included in the solvent for preparing a solution containing the smaller percentage of cellulose and the maximum water content in the solvent decreasing substantially linearly as the percentage cellulose solids in the solution is increased.

10. A process for preparing a solution containing cellulose dissolved in N-methylmorpholine N-oxide which is substantially free of undissolved cellulose and crystals of N-methylmorpholine N-oxide which comprises dissolving the cellulose in said tertiary amine N-oxide containing from about 5.5% to about 22% by weight water and with the weight of cellulose and water in relative amounts within the area of FIG. 5 between lines B and C.

11. A process for preparing a solution containing cellulose dissolved in N,N-dimethylethanolamine N-oxide which is substantially free from crystals of said tertiary amine N-oxide and undissolved cellulose which comprises dissolving the cellulose in said tertiary amine N-oxide containing from about 1.4% to about 12.5% by weight water with the amounts of water and cellulose being within the area between lines B and C of FIG. 3 of the drawing.

12. A process for preparing a solution containing cellulose dissolved in N,N-dimethylcyclohexylamine N-oxide which is substantially free from undissolved cellulose and crystals of said tertiary amine N-oxide which comprises dissolving the cellulose in said tertiary amine N-oxide and from 0.8% to about 21% water and with the relative amounts of water and cellulose being within the area of FIG. 4 between lines B and C.

13. A solution adapted to be shaped to form a shaped article containing cellulose which comprises N-methylmorpholine N-oxide and from about 5.5% to about 22% water with the relative amounts of cellulose and water being within the area between lines B and C of FIG. 5 of the drawing.

14. A solution adapted to be shaped to form a shaped article containing cellulose which comprises N,N-dimethylethanolamine N-oxide and from about 1.4% to about 12.5% water with the relative amounts of water and cellulose being within the area between lines B and C of FIG. 3 of the drawing.

15. A solution adapted to be shaped to form a shaped article containing cellulose which comprises N,N-dimethylcyclohexylamine N-oxide and from 0.8% to about 21% water with the relative amounts of water and cellulose being within the area within the lines B and C of FIG. 4 of the drawing.

16. In a method for making amorphous cellulose or cellulose having a cellulose structure II which comprises dissolving cellulose in a tertiary amine N-oxide solvent and separating the cellulose from said solvent, the improvement which comprises preparing a solution by dissolving cellulose of structure I in a solvent therefor containing N,N,N-triethylamine N-oxide or a tertiary amine N-oxide having a cyclic or pseudo-cyclic structure and water in an amount whereby the resulting solution is substantially free from undissolved cellulose and free from crystals of said tertiary amine N-oxide and from 0.8% to about 29% water based on the weight of the solution and wherein the maximum amount of water in the solution decreases substantially linearly with increase in cellulose content, said solution being prepared at a temperature below the melting point of the tertiary amine N-oxide.

17. A process for making a shaped cellulose article which comprises
(1) dissolving cellulose in an N,N-dimethylcyclohexylamine N-oxide solvent containing from 0.8% to about 21% weight water with the amount of water in the solution being between amounts determined by solving the equations $$B = 37.45 - 2.10 \,(\% \text{ water})$$

and $$C = 33.57 - 3.28 \,(\% \text{ water})$$

with B and C being the percent by weight of cellulose dissolved in the solvent, (2) shaping the resulting solution, and
(3) precipitating the cellulose from the shaped solution, washing the resulting shaped precipitated cellulose substantially free from N,N-dimethylcyclohexylamine N-oxide and drying the shaped precipitated cellulose.

18. A process for making a shaped cellulose article which comprises
(1) dissolving cellulose in N,N,-dimethylethanolamine N-oxide solvent containing from about 1.4% to about 12.5% by weight water and with the amount of water in the solution being between the amounts determined by solving the equations $$B = 28.6 - 2.57 \,(\% \text{ water})$$

and $$C = 21.59 - 2.59 \,(\% \text{ water})$$

with B and C being the percent by weight cellulose dissolved in the solvent, (2) shaping the resulting solution, and
(3) precipitating the cellulose from the shaped solution, washing the resulting precipitated shaped, precipitated cellulose substantially free from N,N,-dimethylethanolamine N-oxide and drying the shaped cellulose.

19. A process for making a shaped cellulose article which comprises
   (1) dissolving cellulose in a N-methylmorpholine N-oxide solvent containing from about 5.5% to about 22% water by weight with the amount of water in the solution being between the amounts determined by solving the equations $B = 34.69 - 1.695$ (% water)

$C = 32.38 - 2.21$ (% water)

with B and C being the percent by weight of cellulose dissolved in the solution,
   (2) shaping the resulting solution, and
   (3) precipitating the cellulose from the shaped solution, washing the resulting precipitated shaped, precipitated cellulose substantially free from N-methylmorpholine N-oxide and drying the shaped cellulose.

20. A process for making a shaped cellulose article which comprises
   (1) dissolving cellulose in an N,N-dimethylcyclohexylamine N-oxide solvent containing from 0.8% to about 21% by weight water with the amount of water in the solution being between amounts by solving the equations $A = B + 2.63\sqrt{1.05 + 0.05 \text{ (\% water)}^2}$ and $D = C - 3.12\sqrt{1.05 + 0.18 \text{ (\% water} - 5.28)^2}$ with A and D being the percent by weight cellulose dissolved in the solution, $B = 37.45 - 2.10$ (% water)

and $C = 33.57 - 3.28$ (% water)

(2) shaping the resulting solution, and
   (3) precipitating the cellulose from the shaped solution, washing the resulting shaped precipitated cellulose substantially free from N,N-dimethylcyclohexylamine N-oxide and drying the shaped precipitated cellulose.

21. A process for making a shaped cellulose article which comprises
   (1) dissolving cellulose in an N,N-dimethylethanolamine N-oxide containing from about 1.4% to about 12.5% by weight water with the amount of water determined by solving the equations $A = B + 1.23\sqrt{0.61 + 0.10 \text{ (\% water} - 56.66)^2}$ and $D = C - 2.05\sqrt{1.29 + 0.58 \text{ (\% water} - 4.41)^2}$ with A and D being the percent by weight of cellulose dissolved in the solution and $B = 28.62 - 2.57$ (% water)

$C = 21.59 - 2.59$ (% water), (2) shaping the resulting solution, and
   (3) precipitating the cellulose from the shaped solution, washing the resulting precipitated shaped, precipitated cellulose substantially free from N-methylmorpholine N-oxide and drying the shaped cellulose.

22. A process for making a shaped cellulose article which comprises
   (1) dissolving cellulose in an N-methylmorpholine N-oxide containing from about 5.5% to about 22% by weight water with the amount of water determined by solving the equations $A = 34.69 - 1.695 \text{ (\% water)} + 0.81\sqrt{1.65 + 0.1 \text{ (\% water} - 12.76)^2}$ and
   $D = 32.38 - 2.21 \text{ (\% water)} - 2.97\sqrt{2.31 + 0.21 \text{ (\%water} - 6.53)^2}$ with A and D being the percent by weight cellulose
   (2) shaping the resulting solution, and
   (3) precipitating the cellulose from the shaped solution, washing the resulting precipitated shaped, precipitated cellulose substantially free from N-methylmorpholine N-oxide and drying the shaped cellulose.

* * * * *

UNITED STATES PATENT OFFICE
CERTIFICATE OF CORRECTION

Patent No. 4,196,282     Dated April 1, 1980

Inventor(s) Neal E. Franks and Julianna K. Varga

It is certified that error appears in the above-identified patent and that said Letters Patent are hereby corrected as shown below:

In Claim 21 correct the first formula to read as follows:

$$A = B + 1.23\sqrt{0.61 + 0.10(\% \text{ water} - 5.66)^2}$$

Signed and Sealed this

Thirteenth Day of October 1981

[SEAL]

Attest:

Attesting Officer

GERALD J. MOSSINGHOFF

Commissioner of Patents and Trademarks